United States Patent
Wang et al.

(10) Patent No.: US 11,942,647 B2
(45) Date of Patent: Mar. 26, 2024

(54) HARNESS ISOLATION PLATE ASSEMBLY, BATTERY MODULE, BATTERY PACK AND DEVICE

(71) Applicant: CONTEMPORARY AMPEREX TECHNOLOGY CO., LIMITED, Fujian (CN)

(72) Inventors: Xuguang Wang, Fujian (CN); Jihua Yao, Fujian (CN)

(73) Assignee: CONTEMPORARY AMPEREX TECHNOLOGY CO., LIMITED, Fujian (CN)

( * ) Notice: Subject to any disclaimer, the term of this patent is extended or adjusted under 35 U.S.C. 154(b) by 189 days.

(21) Appl. No.: 17/563,994

(22) Filed: Dec. 28, 2021

(65) Prior Publication Data

US 2022/0123401 A1    Apr. 21, 2022

Related U.S. Application Data

(63) Continuation of application No. PCT/CN2020/119082, filed on Sep. 29, 2020.

(30) Foreign Application Priority Data

Oct. 21, 2019   (CN) .......................... 201921769307.2

(51) Int. Cl.
*H01M 50/204*    (2021.01)
*H01M 50/249*    (2021.01)
(Continued)

(52) U.S. Cl.
CPC ....... *H01M 50/204* (2021.01); *H01M 50/249* (2021.01); *H01M 50/507* (2021.01); *H01M 50/593* (2021.01); *H01M 2220/20* (2013.01)

(58) Field of Classification Search
CPC ............. H01M 50/204; H01M 50/249; H01M 50/507; H01M 50/593; H01M 2220/20; H01M 50/514; Y02E 60/10
See application file for complete search history.

(56) References Cited

U.S. PATENT DOCUMENTS

| | | | | |
|---|---|---|---|---|
| 5,804,770 A | * | 9/1998 | Tanaka ................ | H01M 50/591 174/138 F |
| 2009/0104516 A1 | * | 4/2009 | Yoshihara ........... | H01M 50/503 429/149 |

(Continued)

FOREIGN PATENT DOCUMENTS

| CN | 202839812 U | 3/2013 |
|---|---|---|
| CN | 106935747 A | 7/2017 |

(Continued)

OTHER PUBLICATIONS

Notice of Reasons for Refusal dated Jun. 5, 2023 received in Japanese Patent Application No. JP 2022-523494.

(Continued)

*Primary Examiner* — Michael L Dignan
(74) *Attorney, Agent, or Firm* — Scully, Scott, Murphy & Presser, P.C.

(57) ABSTRACT

The present application relates to a harness isolation plate assembly, a battery module, a battery pack and a device. The harness isolation plate assembly includes a plurality of isolation units comprising busbars and insulating films connecting the busbars; and a connecting assembly through which the adjacent isolation units are connected. In the present application, the harness isolation plate assembly includes a plurality of separate isolation units. Upon molding, each isolation unit can be processed independently. Moreover, a size of each isolation unit is small, thus reducing processing difficulty. Furthermore, it is easy to control a location of each busbar, such that locating accuracy of the (Continued)

busbars is improved so as to enhance connecting reliability between the busbars and an electrode lead. Meanwhile, in each isolation unit, the busbars are connected through the insulating films, such that a risk of short circuit for the busbars is low.

12 Claims, 13 Drawing Sheets

(51) Int. Cl.
    *H01M 50/507*     (2021.01)
    *H01M 50/593*     (2021.01)

(56) References Cited

U.S. PATENT DOCUMENTS

| | | | | |
|---|---|---|---|---|
| 2010/0081048 | A1* | 4/2010 | Nansaka | H01M 50/561 |
| | | | | 429/178 |
| 2014/0063692 | A1 | 3/2014 | Tan et al. | |
| 2018/0212225 | A1* | 7/2018 | Matsumura | H01M 50/528 |
| 2019/0088912 | A1 | 3/2019 | Goh et al. | |
| 2019/0334134 | A1* | 10/2019 | Reingruber | H01M 50/503 |
| 2020/0295337 | A1* | 9/2020 | You | H01M 50/50 |

FOREIGN PATENT DOCUMENTS

| | | | | |
|---|---|---|---|---|
| CN | 206947422 U | 1/2018 | | |
| CN | 110085780 A | 8/2019 | | |
| CN | 210744017 U | 6/2020 | | |
| JP | 2002329490 A | 11/2002 | | |
| JP | 2010225449 A | 10/2010 | | |
| JP | 2011249303 A | 12/2011 | | |
| JP | 2023-164437 | * | 8/2012 | H01M 2/20 |
| JP | 2012164437 A | 8/2012 | | |
| JP | 2013037777 A | 2/2013 | | |
| JP | 2014216218 A | 11/2014 | | |
| JP | 2017084491 A | 5/2017 | | |
| JP | 2018116880 A | 7/2018 | | |
| JP | 2019036475 A | 3/2019 | | |
| KR | 20170110288 A | 10/2017 | | |

OTHER PUBLICATIONS

International Search Report dated Dec. 30, 2020 issued in PCT/CN2020/119082.
Extended European Search Report dated Jun. 1, 2022 received in European Patent Application No. EP 20879925.4.
Notice of Allowance dated Jan. 30, 2024 received in Korean patent Application No. KR 10-2022-7013053.

* cited by examiner

HARNESS ISOLATION PLATE ASSEMBLY, BATTERY MODULE, BATTERY PACK AND DEVICE

CROSS-REFERENCE TO RELATED APPLICATIONS

This application is a continuation of International Application No. PCT/CN2020/119082, filed on Sep. 29, 2020, which claims priority to Chinese Patent Application No. 201921769307.2, filed on Oct. 21, 2019. The disclosures of the aforementioned applications are hereby incorporated by reference in their entireties.

TECHNICAL FIELD

The present application relates to the technology field of energy storage devices, and in particular, relates to a harness isolation plate assembly, a battery module, a battery pack and a device.

BACKGROUND

A battery module includes a battery cell and a harness isolation plate assembly. The harness isolation plate assembly is formed by a hot-pressing technique and is an integral structure close to a size of the battery module. With increasing requirements on energy density of a power battery, a size of the batter module also increases accordingly, such that a size of the harness isolation plate assembly also increases, thereby causing a low production efficiency of the harness isolation plate assembly upon molding with the hot-pressing technique. Moreover, when the size is large, the positioning accuracy of each component of the harness isolation plate assembly in a hot-pressing process is low, which is disadvantageous for assembling the harness isolation plate assembly and each component of the battery module. Moreover, the welding accuracy between an electrode lead and busbars is reduced.

SUMMARY

The present application provides a harness isolation plate assembly, a battery module, a battery pack and a device. The positioning accuracy of the harness isolation plate assembly is high and the connecting reliability between the busbars and the electrode leads is high.

A first aspect of the present application provides a harness isolation plate assembly, where the harness isolation plate assembly includes a plurality of isolation units at least comprising busbars and insulating films connecting the busbars; and a connecting assembly, the adjacent isolation units being connected through the connecting assembly.

In a possible design, the connecting assembly includes a first connecting component, one of the first connecting component and the isolation unit is provided with protrusions, the other of the first connecting component and the isolation unit is provided with connecting holes, and the protrusions are connected to the connecting holes.

In a possible design, the connecting assembly includes a first connecting component and a second connecting component, one of the first connecting component and the second connecting component is provided with protrusions, the other of the first connecting component and the second connecting component is provided with coordinating holes, and the protrusions are connected to the coordinating holes.

In a possible design, the isolation unit is provided with connecting holes; at least part of the isolation unit is located between the first connecting component and the second connecting component; and the protrusions are connected to the coordinating holes and the connecting holes.

In a possible design, the first connecting component includes a first connecting plate, a second connecting plate and a buffer, one end of the buffer is connected to the first connecting plate, and the other end of the buffer is connected to the second connecting plate; and the first connecting plate and the second connecting plate are respectively connected to the adjacent isolation units.

In a possible design, the buffer is a folded structure located between the first connecting plate and the second connecting plate.

In a possible design, the second connecting component includes a second body; the second body has a second cavity, and the coordinating holes are disposed at one side wall of the second cavity; and the protrusions are disposed at the first connecting component and the protrusions stretch into the second cavity via the coordinating holes.

In a possible design, the protrusion includes a first section and a second section, and an external profile of the first section is greater than an external profile of the second section; and a coordinating hole is in clearance fit with the second section, a size of the coordinating hole is smaller than a size of the external profile of the first section, and the second section is movable along coordinating hole.

In a possible design, the second connecting component further includes a fifth connecting plate and a sixth connecting plate, another side wall of the second body is provided with a second opening, and the second opening is disposed opposite to the coordinating holes; the fifth connecting plate and the sixth connecting plate respectively extend outward from a side wall of the second opening; at least part of the corresponding isolation unit is located between the fifth connecting plate and the sixth connecting plate and abuts against the fifth connecting plate and the sixth connecting plate; and the first connecting component includes a third connecting plate and a fourth connecting plate, and at least part of the corresponding isolation unit is located between the third connecting plate and the fourth connecting plate and abuts against the third connecting plate and the fourth connecting plate.

A second aspect of the present application includes a battery module comprising battery cells having electrode leads; a harness isolation plate assembly, the harness isolation plate assembly being the harness isolation plate assembly as described above, where the busbars of the harness isolation plate assembly are connected to the electrode leads.

A third aspect of the present application provides a battery pack comprising a box body and the battery module as described above, where the battery module is fixed into the box body.

A fourth aspect of the present application provides a device, using a battery cell as a power supply, and the device includes: a power source, the power source is configured to provide a driving force to the device; and the battery module described above configured to provide electrical energy for the power source.

In the present application, the harness isolation plate assembly includes a plurality of separate isolation units. Upon molding, each isolation unit can be processed independently. Moreover, a size of each isolation unit is small, thus reducing processing difficulty. Furthermore, it is easy to control the location of each busbar, such that positioning accuracy of the busbars is improved so as to enhance connecting reliability between the busbars and the electrode leads. Meanwhile, in each isolation unit, the busbars are connected through the insulating films, such that a risk of short circuit for the busbars is low. In addition, adjacent isolation units are connected through the connecting assembly, thus forming a complete harness isolation plate assembly and improving rigidity of the harness isolation plate assembly to facilitate the connection of the busbars and the electrode leads.

It should be understood that the foregoing general descriptions and the following detailed descriptions are merely examples, and do not constitute any limitation on the present application.

BRIEF DESCRIPTION OF DRAWINGS

To describe the technical solutions in the embodiments of the present application more clearly, the following briefly describes the accompanying drawings required for describing the embodiments of the present application. Apparently, the accompanying drawings in the following description show merely some embodiments of the present application, and a person of ordinary skill in the art may still derive other drawings from these accompanying drawings without creative efforts.

Figure 1:
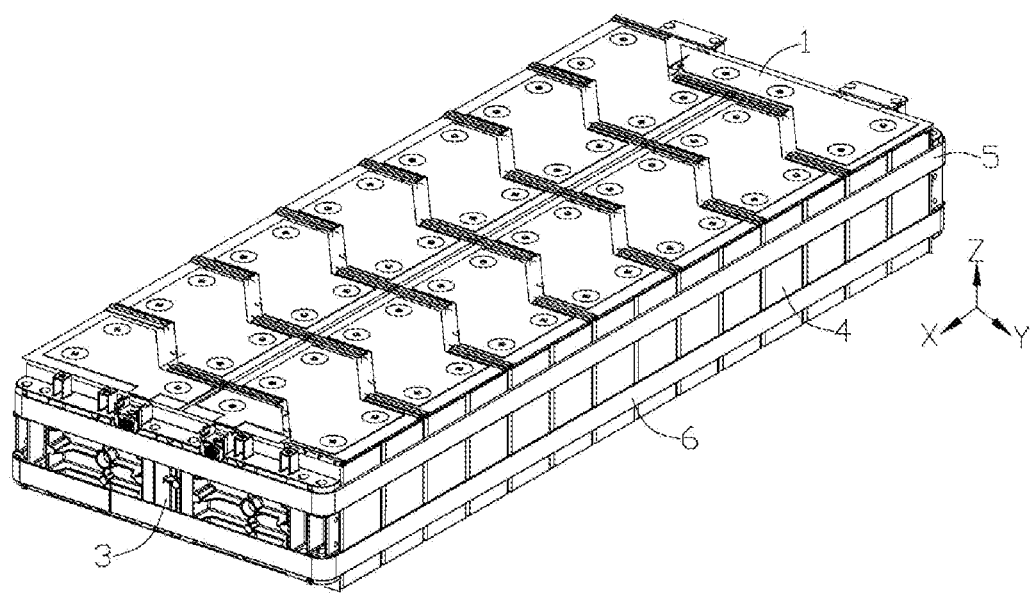
FIG. 1 is a structural diagram of a battery module provided by the present application in a specific embodiment.

The accompanying drawings herein are incorporated in the description as a part of the description, showing embodiments that are in accordance with the present application, and used together with the description to explain a principle of the present application.

DESCRIPTION OF EMBODIMENTS

For a better understanding of the technical solutions of the present application, the following describes the embodiments of the present application in details with reference to accompanying drawings.

It should be noted that the described embodiments are merely some but not all of the embodiments of the present application. All other embodiments obtained by a person of ordinary skill in the art based on the embodiments of the present application without creative efforts shall fall within the protection scope of the present application.

The terms used in the embodiments of the present application are merely for the purpose of describing specific embodiments, and are not intended to limit the present application. The singular forms of "a", "the", and "said" used in the embodiments of the present application and the appended claims are also intended to include most forms unless other meanings are clearly represented in the context.

It should be understood that a term "and/or" used in this text is only an associative relationship for describing associated objects, indicating that three relationships may exist. For example, A and/or B may indicate three situations: A exists independently; A and B exist simultaneously; and B exists independently. In addition, a character "/" in this text generally indicates an "or" relationship between contextually associated objects.

It should be noted that the terms such as "up", "down", "left", and "right" etc. described in the embodiments of the present application are described as seen from the angles shown in the accompanying drawings, and should not be understood as a limitation on the embodiments of the present application. In addition, in the context, it should be further understood that when an element is connected to as being "above" or "under" another element, the element can not only be directly connected "above" or "under" the another element, but also be indirectly connected "above" or "under" the another element through an intermediate element.

Embodiments of the present application provide a device, where the device uses a battery cell 4 as a power supply, a battery pack, a battery module A and a harness isolation plate assembly 1, where the device which uses a battery cell 4 as a power supply includes a vehicle, a ship, a small aircraft, and other mobile devices. The device includes a power source, the power source is configured to provide a driving force to the device and the power source can be configured as the battery module A for providing electrical energy to the power source. The driving force of the device can all be electrical energy and can also include electrical energy and other energy (for example mechanic energy). The power source can be the battery module A (or the battery pack) and can also be the battery module A (or the battery pack) and engine etc. Therefore, all devices which are capable of using a battery cell 4 as a power supply shall be within the protection scope of the present application.

With a vehicle as an example, the vehicle in embodiments of the present application can be a new energy vehicle, which can be a pure electric vehicle or can be a hybrid power vehicle or an extended-range vehicle etc. The vehicle can include a battery pack and a vehicle body, where the battery pack is disposed to the vehicle body, and the vehicle body is further provided with a driving motor, which is electrically connected to the battery pack and for which electrical energy is provided by the battery pack. The driving motor is connected through a transmission mechanism to wheels on the vehicle body so as to drive the vehicle to travel ahead. Specifically, the battery pack can be horizontally disposed at bottom of the vehicle body.

Figure 21:
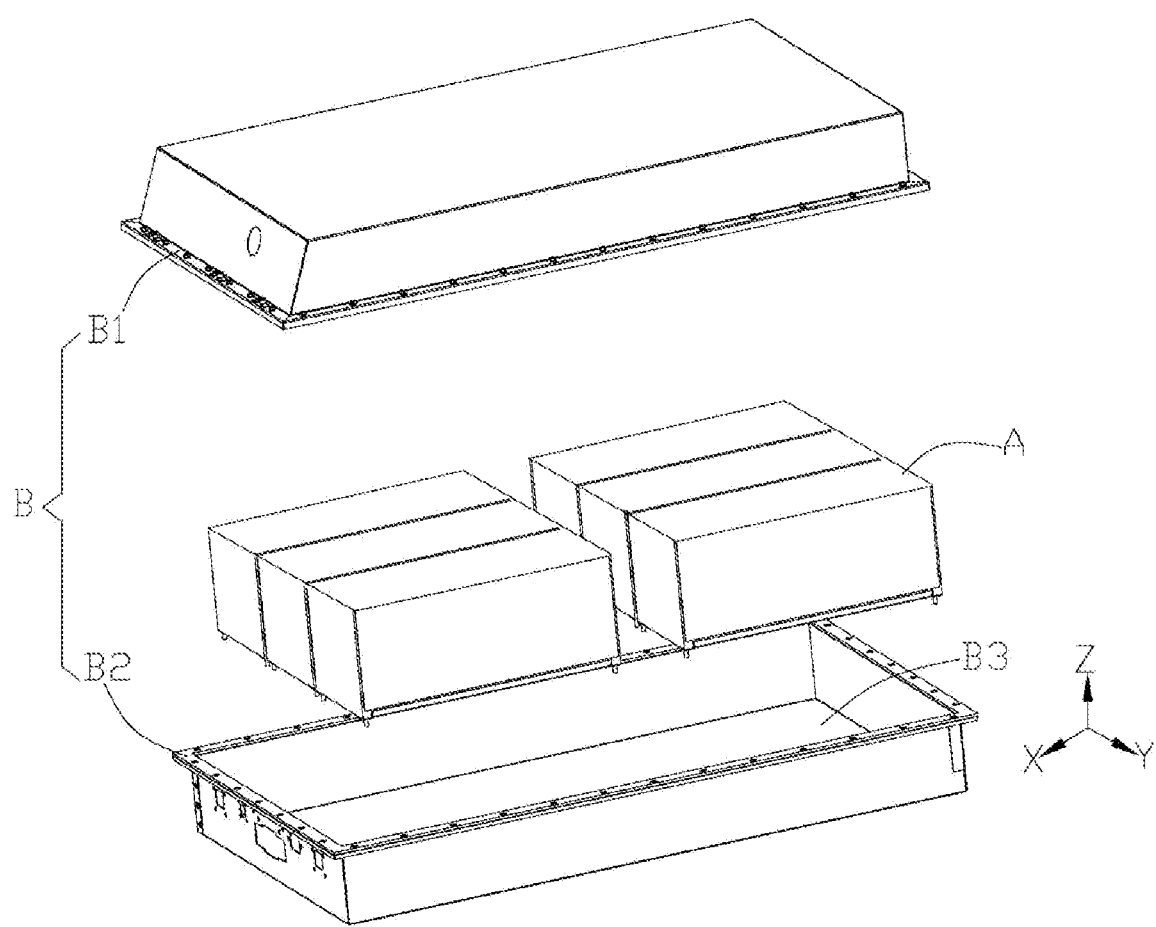
FIG. 21 is a structural diagram of a battery pack provided by the present application in a specific embodiment.

As shown in FIG. 21, the battery pack includes a box body B and the battery module A of the present application, where the box body B has an accommodating cavity B3, into which the battery module A is accommodated. The number of the battery module A is one or multiple and a plurality of battery modules A are arranged in the accommodating cavity B3. The type of the box body B is not limited, as it can be a frame-shaped box body, a disk-shaped box body or a box-shaped box body etc. Specifically, as shown in FIG. 21, the box body B can include a lower box body B2 which accommodates the battery module A and an upper box body B1 which is closed with the lower box body B2.

Figure 6:
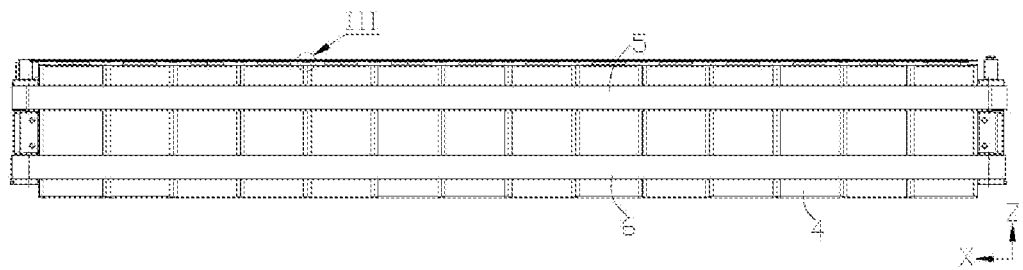
FIG. 6 is a side view of FIG. 1 in a first specific embodiment.
Figure 8:
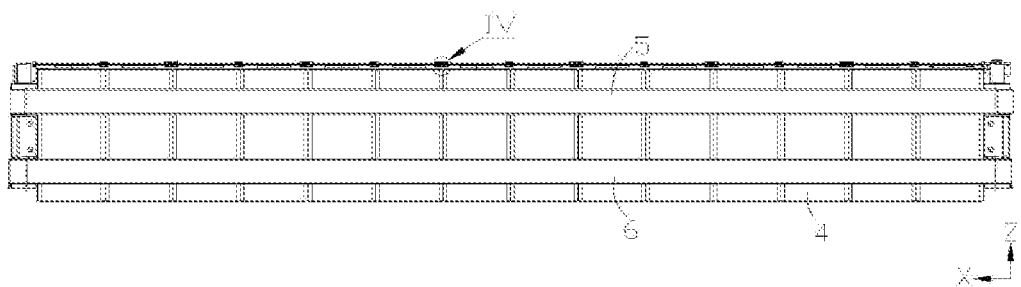
FIG. 8 is a side view of FIG. 1 in a second specific embodiment.

As shown in FIG. 1, FIG. 6 and FIG. 8, the battery module A includes a plurality of battery cells 4 and a frame structure for securing the battery cells 4, where the plurality of battery cells 4 are stacked to each other and the stacking direction of each battery cell 4 is defined as the length direction X as described in the present application. The frame structure includes an end plate 3, which is located at two end portions of the battery cell 4 along the length direction X for the battery cell 4 to move along the length direction X. Meanwhile, in a specific embodiment, the frame structure can further include side plates (not shown in drawings) and two side plates are located at two sides of the battery cell 4 along a width direction Y. Moreover, the side plates are connected to the end plates 3, thereby forming a frame structure. In another specific embodiment, the frame structure may not be provided with side plates. the battery cells 4 are connected by a first strap 5 and a second strap 6 after being stacked, the above frame structure is formed with the end plate 3 and the above two straps.

Specifically, the battery cell 4 includes an electrode lead 41 and each of the battery cells 4 includes a positive electrode lead and a negative electrode lead. In the battery module A, a plurality of battery cells 4 are electrically connected specifically in connecting manners like series connection, parallel connection or hybrid connection and adjacent battery cells 4 are connected through busbars 112 (shown in FIG. 13). For example, when the battery cells 4 are in series connection, the positive electrode lead of one battery cell 4 is connected to the negative electrode lead of the adjacent battery cell 4 thereof through busbars 112.

Figure 2:
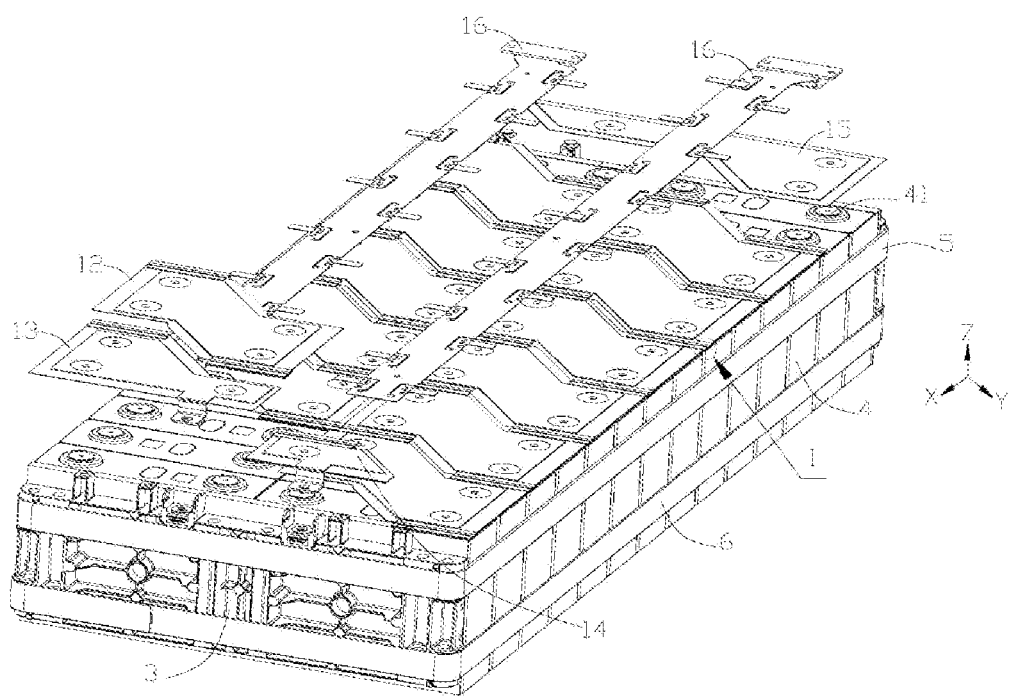
FIG. 2 is a partially exploded view of FIG. 1.

Meanwhile, as shown in FIG. 2, the battery module A further includes a circuit board 16, which is electrically connected to the busbars 112, thereby implementing collection of voltage and/or current information of the battery cell 4 through the busbars 112. The circuit board 16 is further electrically connected to a temperature collection unit (not shown in drawings), thereby collecting temperature of the battery cell 4, and a collected signal is output through a connector.

Figure 4:
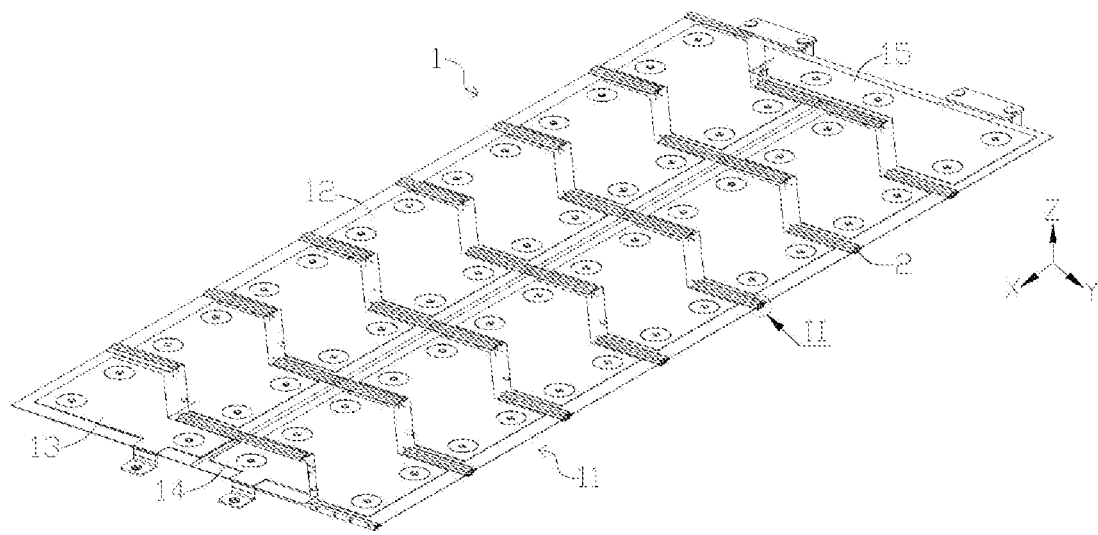
FIG. 4 is a structural diagram of a harness isolation plate assembly in FIG. 1.

As shown in FIG. 1, the battery module A further includes a harness isolation plate assembly 1, which is placed at one end of the electrode lead 41 close to the battery cell 4. In the embodiment as shown in FIG. 1, the harness isolation plate assembly 1 is located over the battery cell 4. As shown in FIG. 2 and FIG. 4, the harness isolation plate assembly 1 includes a plurality of (two or more) isolation units 11, each of the isolation units 11 is disposed separately, and the isolation units 11 includes insulating films 113 and busbars 112 (shown in FIG. 13). Moreover, the busbars 112 are connected to the insulating films 113. After the connection, the busbars 112 are located inside the insulating films 113. Meanwhile, the insulating films 113 further perform the function of insulation, thereby preventing short circuit occurring to each electrical element. Meanwhile, the harness isolation plate assembly 1 further includes a connecting assembly 2, the adjacent isolation units 11 are connected through the connecting assembly 2.

In another embodiment, the isolation units 11 includes insulating films 113, busbars 112 and circuit boards 16, where each of the busbars 112 and the circuit boards 16 are both connected to the insulating films 113. After the connection, the busbars 112 and the circuit boards 16 are located inside the insulating films 113. Meanwhile, the insulating films 113 also perform the function of insulation, thereby preventing short circuit occurring to each electrical element. In another further embodiment, of the plurality of isolation units 11, a part of the isolation units 11 includes insulating films 113 and busbars 112, and another part of the isolation units includes insulating films 113, busbars 112 and circuit boards 16.

In the present application, the harness isolation plate assembly 1 includes a plurality of separate isolation units 11. Upon molding, each isolation unit 11 can be processed independently. Moreover, a size of each isolation unit 11 is small relative to a complete harness isolation plate assembly 1, thus reducing processing difficulty. Furthermore, it is easy to control the location of each busbar 112, such that positioning accuracy of the busbars 112 is improved so as to enhance connecting reliability between the busbars 112 and an electrode lead 41. Meanwhile, in each isolation unit 11, the busbars 112 are connected through the insulating films 113, such that a risk of short circuit for the busbars 112 is low. In addition, adjacent isolation units 11 are connected through the connecting assembly 2, thus forming a complete harness isolation plate assembly 1 and improving rigidity of the harness isolation plate assembly 1 to facilitate connection of the busbars 112 to the electrode lead 41.

Figure 11:
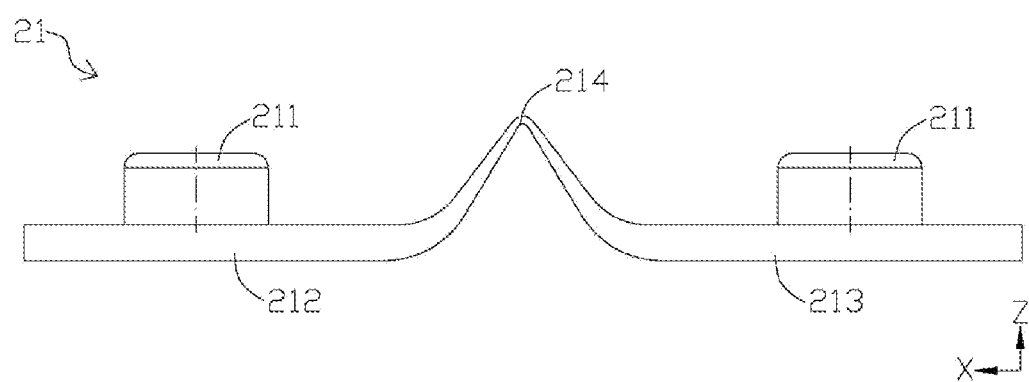
FIG. 11 is a side view of a first connecting component in FIG. 10.
Figure 13:
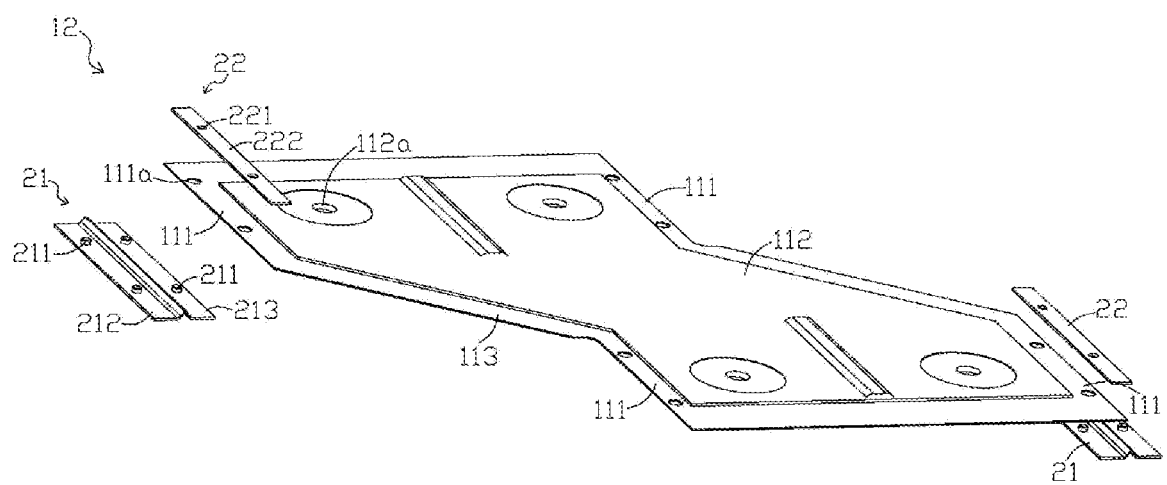
FIG. 13 is an exploded view of a first unit and a connecting assembly in FIG. 4, where the connecting assembly is a first embodiment.
Figure 14:
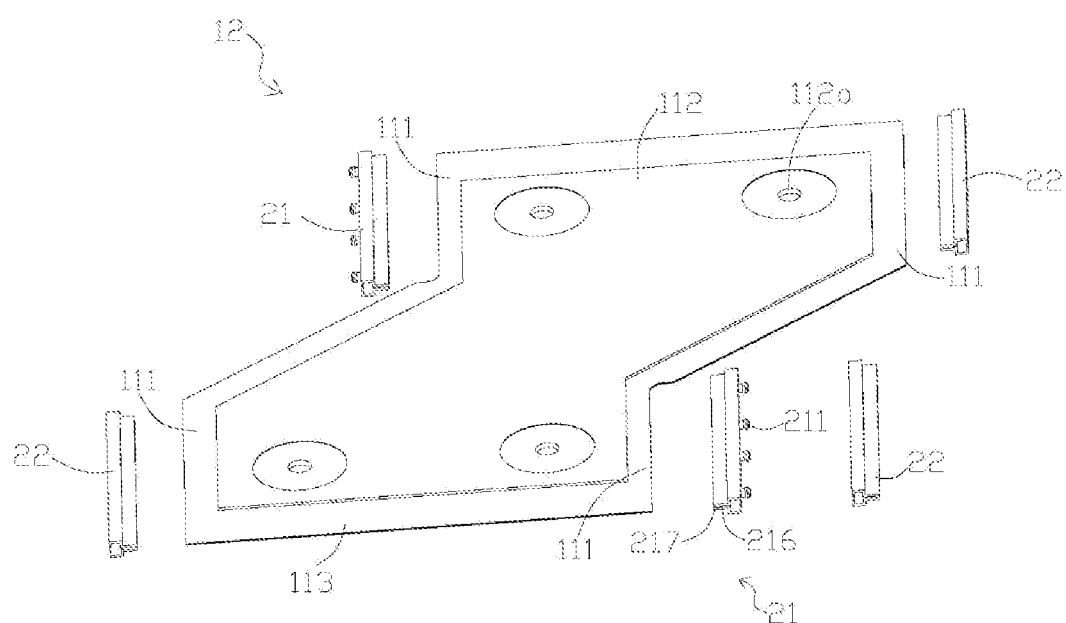
FIG. 14 is an exploded view of a first unit and a connecting assembly in FIG. 4, where the connecting assembly is a second embodiment.
Figure 15:
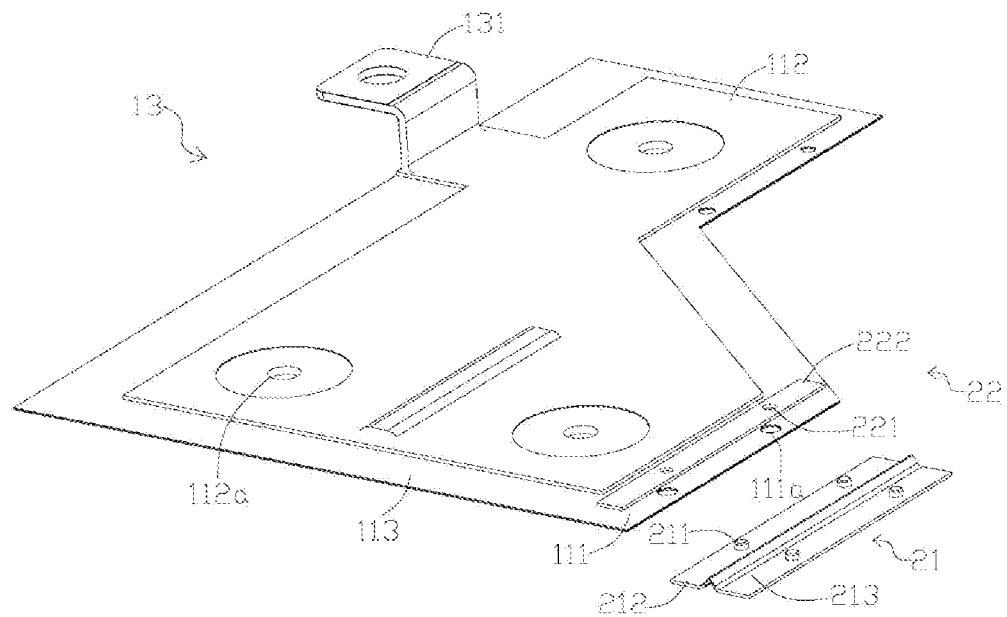
FIG. 15 is an exploded view of a second unit and a connecting assembly in FIG. 4, where the connecting assembly is a first embodiment.
Figure 16:
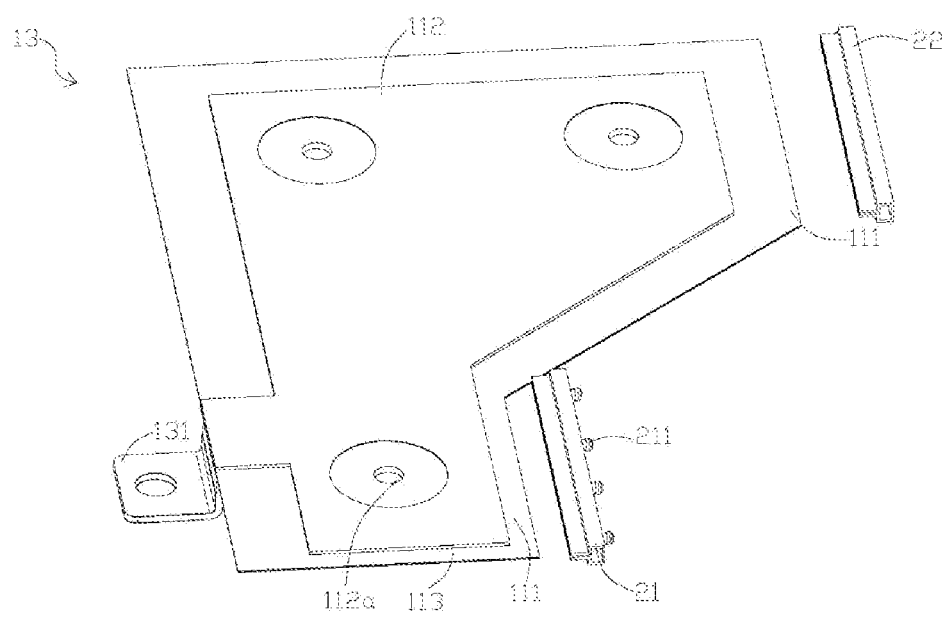
FIG. 16 is an exploded view of a second unit and a connecting assembly in FIG. 4, where the connecting assembly is a second embodiment.
Figure 17:
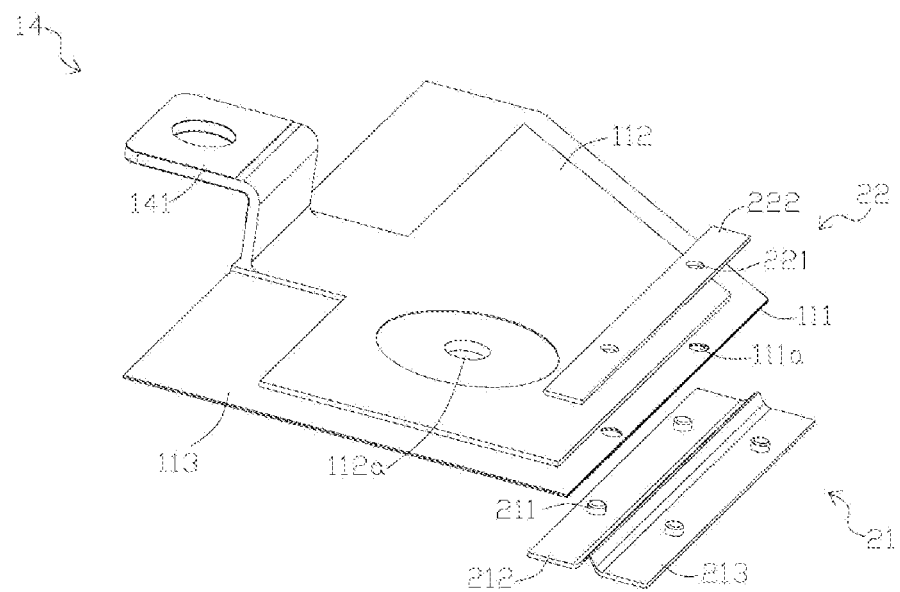
FIG. 17 is an exploded view of a third unit and a connecting assembly in FIG. 4, where the connecting assembly is a first embodiment.
Figure 18:
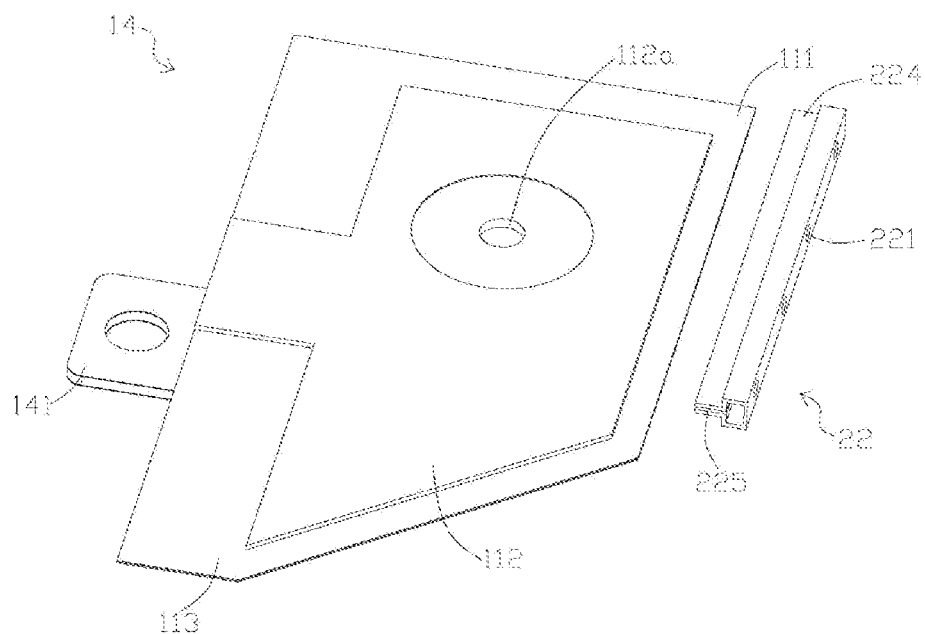
FIG. 18 is an exploded view of a third unit and a connecting assembly in FIG. 4, where the connecting assembly is a second embodiment.
Figure 19:
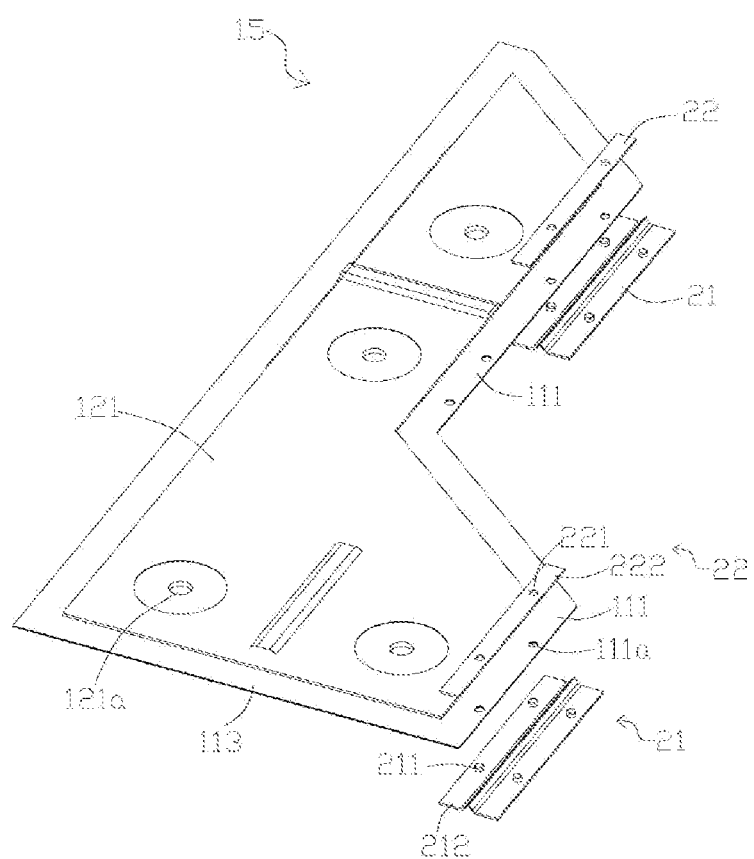
FIG. 19 is an exploded view of a fourth unit and a connecting assembly in FIG. 4, where the connecting assembly is a first embodiment.
Figure 20:
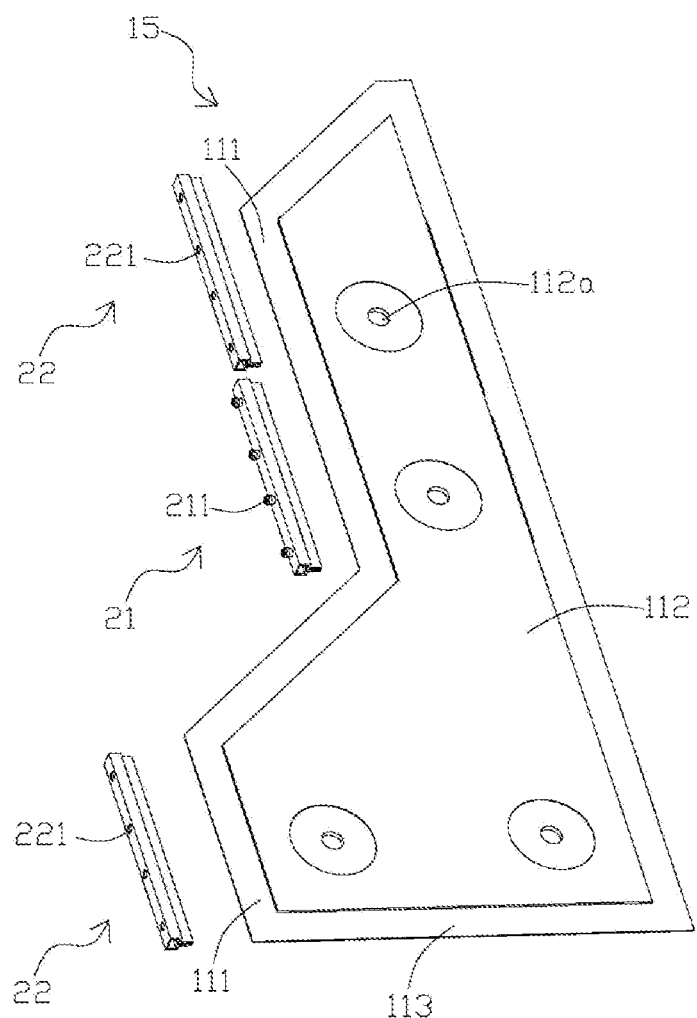
FIG. 20 is an exploded view of a fourth unit and a connecting assembly in FIG. 4, where the connecting assembly is a second embodiment.

In a specific embodiment, the connecting assembly 2 includes a first connecting component 21. As shown in FIG. 11 and FIG. 13, one of the first connecting component 21 and the corresponding isolation unit 11 is provided with protrusions 211 and the other of the first connecting component 21 and the corresponding isolation unit 11 is provided with connecting holes 111a, and the protrusions 211 are connected to the connecting holes 111a.

For example, the first connecting component 21 is provided with protrusions 211, the isolation units 11 (comprising busbars 112 and insulating films 113) are provided with connecting holes 111a, which can be disposed on the insulating films 113 of the isolation units 11 or can be disposed on the busbars 112 or simultaneously disposed on the busbars 112 and the insulating films 113. Alternatively, the isolation units 11 (comprising busbars 112, circuit boards 16 and insulating films 113) are provided with connecting holes 111a, the connecting holes 111a may be located at the insulating films 113 or may be located at the busbars 112 or may be located at the circuit boards 16; alternatively, it may also be located at any combination of the insulating films 113, the busbars 112 and the circuit boards 16. Therefore, in the present application, the positions for providing the connecting holes 111a are not limited.

In the embodiments, the adjacent isolation units 11 are respectively connected to one same first connecting component 21, thus implementing connection between the adjacent isolation units 11. Moreover, when the connecting assembly 2 only includes a first connecting component 21, the advantage of having a simple structure is possessed.

Specifically, as shown in FIG. 13 to FIG. 18, each of the isolation units 11 includes a connecting portion 111, which is used for connection to the connecting assembly 2. In a specific embodiment, the connecting portion 111 is formed by the insulating films 113 and/or the busbars 112. In another specific embodiment, the connecting portion 111 is formed by the insulating films 113 and/or the busbars 112 and/or the circuit boards 16. As compared with the connecting component 21, a thickness of the isolation unit 11 is smaller. In the embodiment, the above connecting holes 111a are disposed at the isolation unit 11 with a smaller thickness and the protrusions 211 are disposed at the first connecting component 21.

In a specific embodiment, the connecting portion 111 can be formed by the insulating films 113 only. At this time, the connecting holes 111a are only located at the insulating films 113, and both the busbars 112 and the circuit boards 16 are not provided with the connecting holes 111a, thus improving integrity of the busbars 112 and the circuit boards 16.

More specifically, as shown in FIG. 11, the first connecting component 21 includes a first connecting plate 212 and a second connecting plate 213, where the first connecting plate 212 and the second connecting plate 213 are respectively connected to adjacent isolation units 11, that is, the distribution of the first connecting plate 212 and the second connecting plate 213 is consistent with the distribution of the adjacent isolation units 11.

Figure 3:
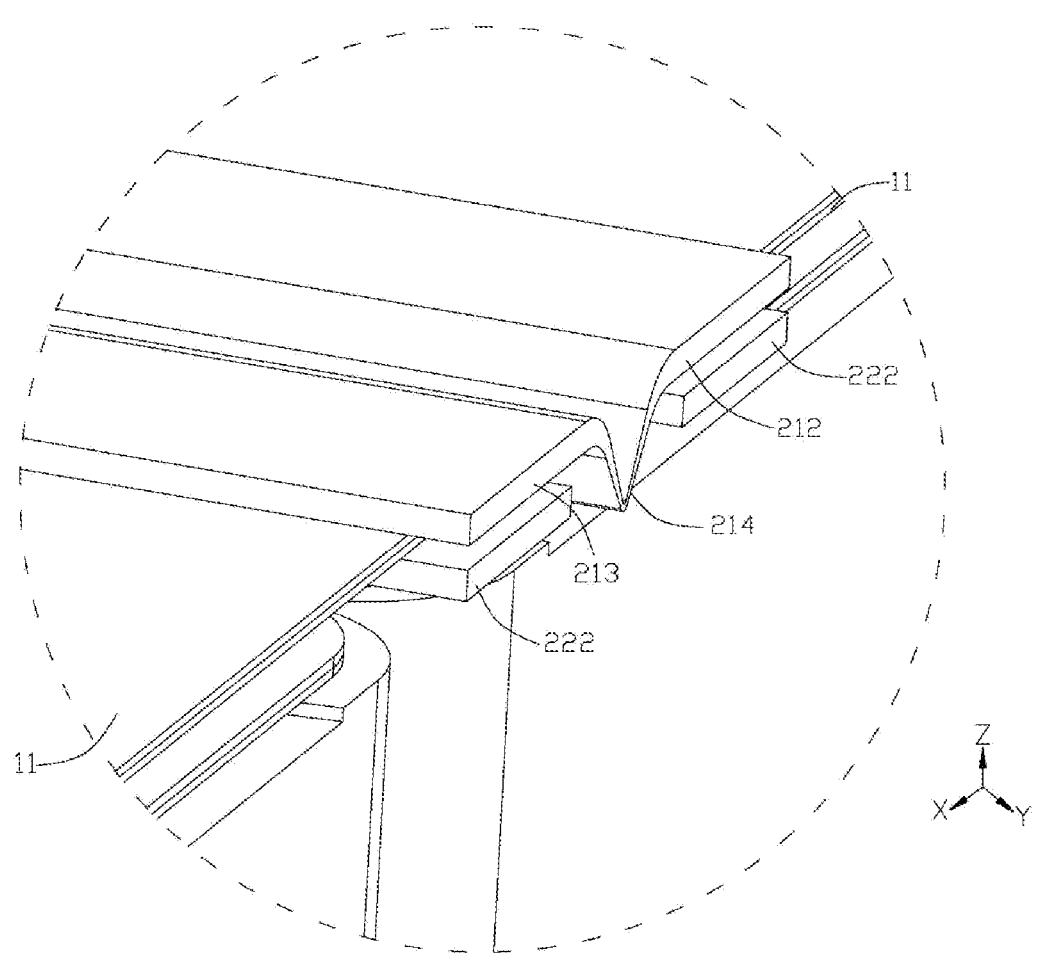
FIG. 3 is a partially enlarged view of part I in FIG. 2.
Figure 10:
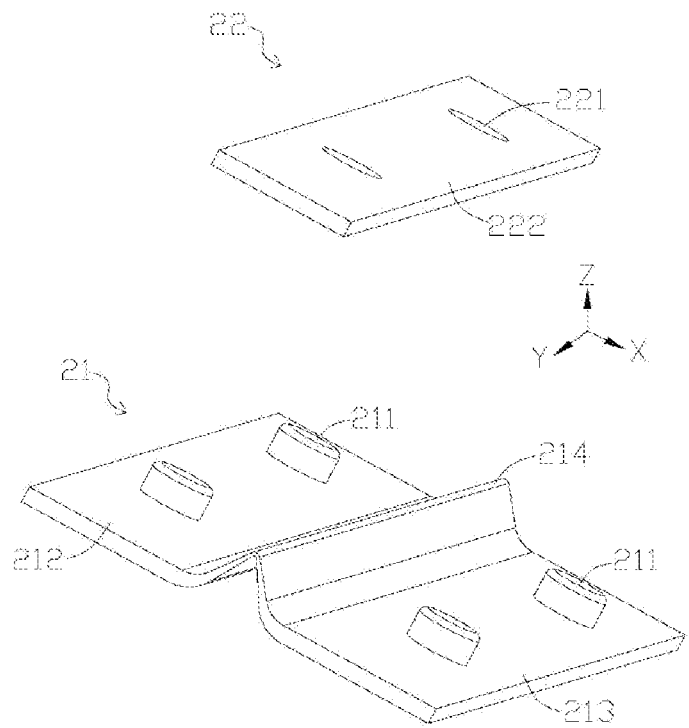
FIG. 10 is a structural diagram of a connecting assembly in FIG. 4 in a first specific embodiment.

As shown in FIG. 4, of the harness isolation plate assembly 1, each isolation unit 11 is connected along the length direction X. Therefore, in the embodiment, the first connecting plate 212 and the second connecting plate 213 are arranged along the length direction X. Meanwhile, as shown in FIG. 3, FIG. 10 and FIG. 11, the first connecting component 21 further includes a buffer 214, which is connected between the first connecting plate 212 and the second connecting plate 213. While being affected by an expansion force, the buffer 214 is capable of deforming along the length direction X, thus performing the buffering function so as to enhance connecting reliability of the connecting assembly 2 and the isolation units 11, and the rigidity of the connecting assembly 2 and the isolation units 11.

In a possible design, as shown in FIG. 11, the buffer 214 is a folded structure located between the first connecting plate 212 and the second connecting plate 213, the folded structure protrudes along a height direction Z and the protruding direction thereof is the same as the protruding direction of the protrusions 211 disposed at the first connecting plate 212 and the second connecting plate 213, thus reducing the space occupied by the connecting assembly 2 along the height direction Z.

Figure 12:
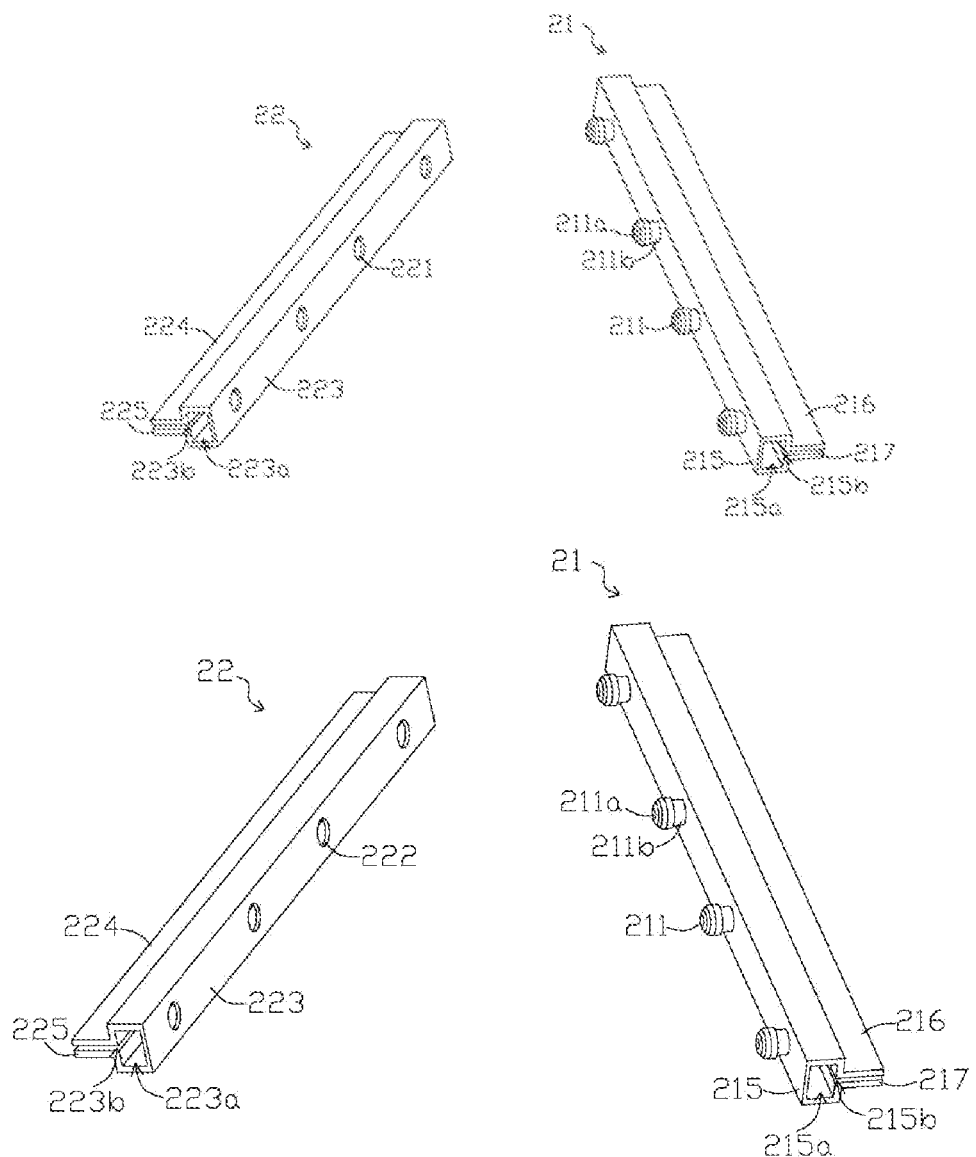
FIG. 12 is a structural diagram of a connecting assembly in FIG. 4 in a second specific embodiment.

In another specific embodiment, as shown in FIG. 10 and FIG. 12, the connecting assembly 2 includes a first connecting component 21 and a second connecting component 22 that are disposed separately, where one of the first connecting component 21 and the second connecting component 22 is provided with protrusions 211 and the other of the first connecting component 21 and the second connecting component 22 is provided with coordinating holes 221, and the protrusions 211 are connected to the coordinating holes 221.

In the embodiment, the connecting assembly 2 includes a first connecting component 21 and a second connecting component 22 that are disposed separately, and the first connecting component 21 and the second connecting component 22 are respectively connected to adjacent isolation units 11, thus implementing connection between the adjacent isolation units 11.

Specifically, in a possible design, as shown in FIG. 13, the first connecting component 21 and the second connecting component 22 of the connecting assembly 2 are connected with the coordinating holes 221 through the protrusions 211. Meanwhile, the isolation units 11 are provided with connecting holes 111a, at least part of the isolation units 11 is located between the first connecting component 21 and the second connecting component 22, and the protrusions 211 are connected to the coordinating holes 221 and the connecting holes 111a, thus implementing connection between the isolation units 11, and the first connecting component 21 and/or the second connecting component 22.

Figure 7:
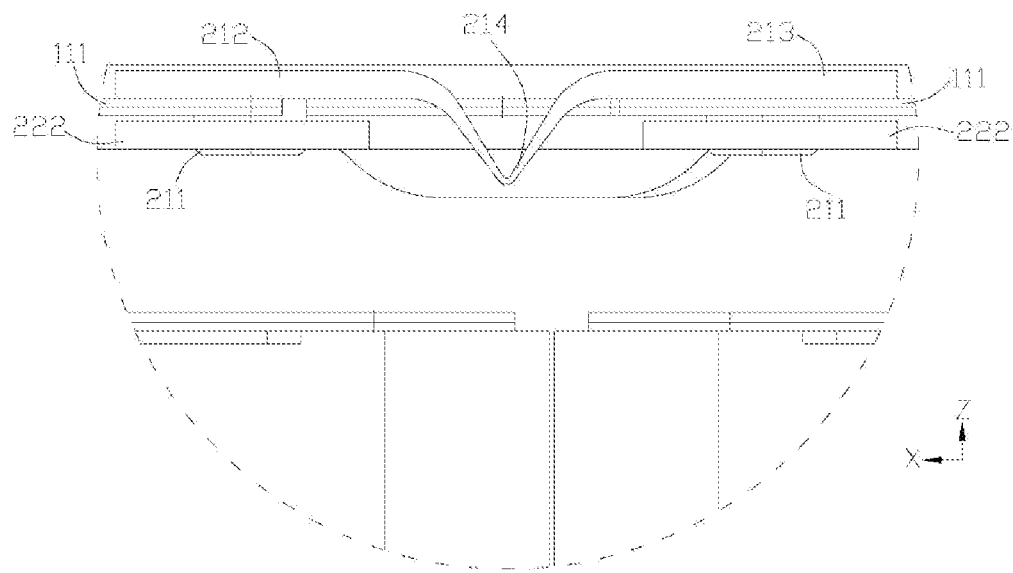
FIG. 7 is a partially enlarged view of part III in FIG. 6.

In the embodiment, as shown in FIG. 7, at least part of the isolation units 11 is located between the first connecting component 21 and the second connecting component 22, thus increasing a contact area between the isolation units 11 and the connecting assembly 2, so as to enhance connecting reliability between the isolation units 11 and the connecting assembly 2.

In the embodiment as shown in FIG. 10, the first connecting component 21 includes a first connecting plate 212 and a second connecting plate 213, where the first connecting plate 212 and the second connecting plate 213 are respectively connected to adjacent isolation units 213, and a buffer 214 is further connected between the first connecting plate 212 and the second connecting plate 213, where the buffer 214 is capable of deforming along the length direction X while being affected by an expansion force, thus performing the buffering function.

Meanwhile, in the embodiment as shown in FIG. 7 and FIG. 10, the second connecting component 22 of the connecting assembly 2 includes two fitting plates 222, which are disposed at an interval. The above buffer 214 stretches into a gap between the two fitting plates 222. The two fitting plates 222 are respectively arranged along the height direction Z with the first connecting plate 212 and the second connecting plate 213 and along the height direction Z, at least part of one of adjacent isolation units 11 is located between the first connecting plate 212 and the fitting plates 222 and at least part of the other of adjacent isolation units 11 is located between the second connecting plate 213 and the fitting plates 222, i.e. along the height direction Z, the isolation units 11 are clamped between the first connecting component 21 and the second connecting component 22, the three are capable of implementing connection along the height direction Z. Therefore, in order to further improve connecting reliability between the isolation units 11 and the connecting assembly 2, the isolation units 11 and the first connecting component 21 are connected through the protrusions 211 and the connecting holes 111a.

In the embodiment, the fitting plates 222 are disposed to perform the supporting function for the isolation units 11 and the fitting plates 222 and the two connecting plates are both of a rigid structure, such that the connecting reliability between the fitting plates 222 and the connecting plate is high, thereby enhancing the connecting reliability between the connecting assembly 2 and the isolation units 11 with a low rigidity.

Specifically, of the connecting assembly 2, the protrusions 211 are with the elliptic cylinder structure. Correspondingly, the coordinating holes 221 are elliptical holes, thus implementing high connecting reliability between the protrusions 211 and the coordinating holes 221.

In another specific embodiment, as shown in FIG. 12, the connecting assembly 2 includes a first connecting component 21 and a second connecting component 22, where the first connecting component 21 and the second connecting component 22 are respectively connected to adjacent isolation units 11, and the first connecting component 21 and the second connecting component 22 are connected through the protrusions 211 and the coordinating holes 221.

Specifically, as shown in FIG. 12, the first connecting component 21 includes a first body 215 and the second connecting component 22 includes a second body 223, the second body 223 having a second cavity 223a. The above coordinating holes 221 are disposed at one side wall of the second cavity 223a, the protrusions 211 are disposed at one side wall of the first body 215 and the coordinating holes 221 are disposed opposite to the protrusions 211 to facilitate connection of the protrusions 211 with the coordinating holes 221. Moreover, after the connection, the protrusions 211 stretch into the second cavity 223a through the coordinating holes 221. In the embodiment, the second cavity 223a of the second connecting component 22 is capable of reducing weight of the two connecting components, thus reducing weight of the harness isolation plate assembly 1 and enhancing energy density of the battery module A. Meanwhile, the second cavity 223a that is disposed is also capable of providing a mounting space for the protrusions 211.

Figure 5:
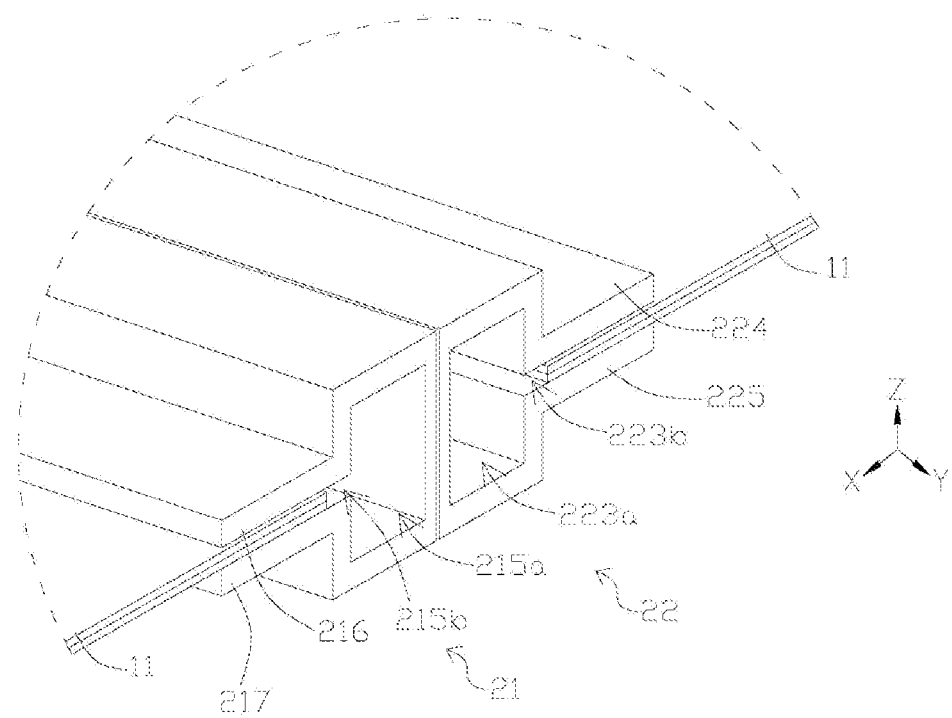
FIG. 5 is a partially enlarged view of part II in FIG. 4.

In a specific embodiment, as shown in FIG. 5, the first body 215 can have a first cavity 215a, which is capable of reducing weight of the first connecting component 21, thus further enhancing energy density of the battery module A. Certainly, the first body 215 can also be a solid structure.

Figure 9:
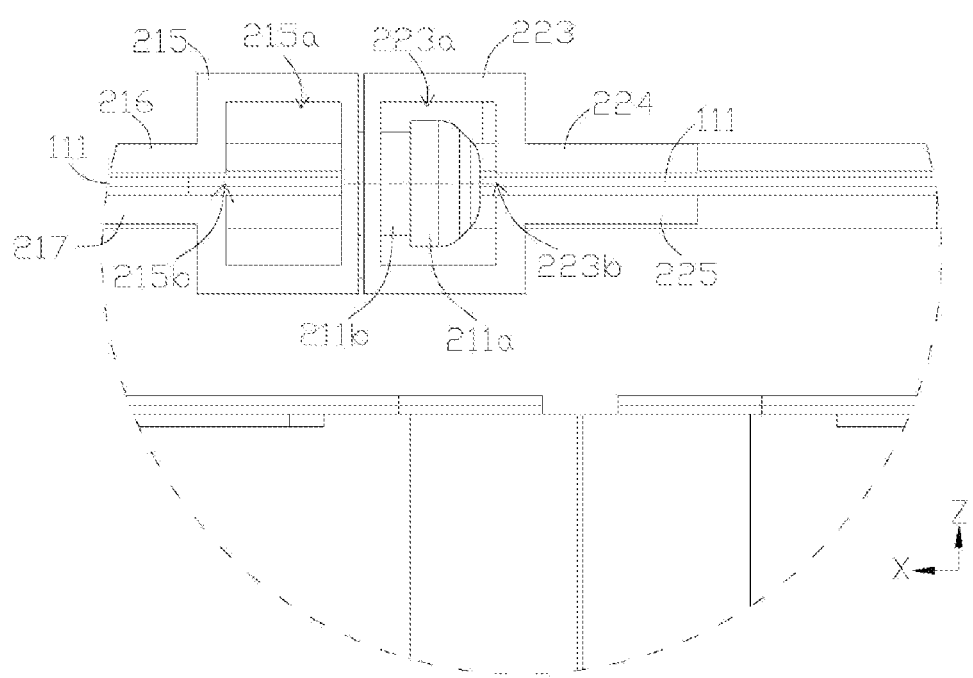
FIG. 9 is a partially enlarged view of part IV in FIG. 8.

In a possible design, as shown in FIG. 9 and FIG. 12, each of the protrusions 211 includes a first section 211a and a second section 211b that are connected to each other, and an external profile of the first section 211a is greater than an external profile of the second section 211b, and the second section 211b is connected to a side wall of the first cavity 215a. Meanwhile, the coordinating hole 221 is in clearance fit with the second section 211b, that is, a size of the coordinating hole 221 is greater than a size of the external profile of the second section 211b, a size of the coordinating hole 221 is smaller than a size of an external profile of the first section 211a, and after the protrusions 211 are connected to the coordinating holes 221, the first section 211a thereof stretches into the second cavity 223a and the second section 211b is movable along the coordinating hole 221.

In the embodiment, in the connecting assembly 2, the coordinating hole 221 and the protrusions 211 are arranged along the length direction X. After the coordinating holes 221 and the protrusions 211 coordinate with each other, since the second section 211b of the protrusion 211 is movable along the coordinating hole 221. Therefore, the harness isolation plate assembly 1 is capable of performing the buffering function through relative movement of the protrusion 211 with the coordinating hole 221 after being affected by the expansion force. That is, in the embodiment, the second section 211b of the protrusion 211 is movable along the coordinating hole 221, which is equivalent to a buffer for releasing the expansion force, thus improving strength of the harness isolation plate assembly 1.

Specifically, as shown in FIG. 5, FIG. 9 and FIG. 12, the first connecting component 21 includes a third connecting plate 216 and a fourth connecting plate 217. Along the width direction Y, a side wall of the first cavity 215a is provided with a first opening 215b, which is opposite to the protrusions 211, that is, the first opening 215b is disposed at a side wall opposite to the protrusions 211. Moreover, the third connecting plate 216 and the fourth connecting plate 217 respectively extend outward from the side wall of the first opening 215b, the third connecting plate 216 and the fourth connecting plate 217 are arranged along the height direction Z, and the first opening 215b is formed between the third connecting plate 216 and the fourth connecting plate 217. While being connected to the isolation units 11, at least part of the corresponding isolation unit 11 is located between the third connecting plate 216 and the fourth connecting plate 217 and abuts against the third connecting plate 216 and the fourth connecting plate 217, thus realizing connection of the isolation units 11 to the first connecting component 21.

Meanwhile, as shown in FIG. 5, FIG. 9 and FIG. 12, the second connecting component 22 further includes a fifth connecting plate 224 and a sixth connecting plate 225. Along the width direction Y, a side wall of the second cavity 223b is provided with a second opening 223b, which is disposed relative to the coordinating holes 221, that is, the second opening 223b is disposed at a side wall relative to the coordinating holes 221. Moreover, the fifth connecting plate 224 and the sixth connecting plate 225 respectively extend outward from the side wall of the first opening 223b along the length direction X, and the fifth connecting plate 224 and the sixth connecting plate 225 are arranged along the height direction Z, and the second opening 223b is formed between the fifth connecting plate 224 and the sixth connecting plate 225. While being connected to the isolation units 11, at least part of the corresponding isolation unit 11 is located between the fifth connecting plate 224 and the sixth connecting plate 225 and abuts against the fifth connecting plate 224 and the sixth connecting plate 225, thus realizing connection of the isolation unit 11 to the second connecting component 22.

In the embodiment, when the two connecting components are connected to the corresponding isolation units 11, it is not necessary to dispose connecting holes for the isolation units 11, as connection of the isolation units 11 to the corresponding connecting component is realized by pressing the isolation units 11 tightly with two connecting plates arranged along the height direction Z, such that the isolation units 11 are capable of maintaining its integrity.

In the above embodiments, as shown in FIG. 2 and FIG. 4, the specific form of the isolation units 11 of the harness isolation plate assembly 1 includes a second unit 13, a third unit 14 and a fourth unit 15, where as shown in FIG. 15 to FIG. 18, the second unit 13 is provided with a negative output pole 131, and the third unit 14 is provided with a positive output pole 141. Therefore, the second unit 13 and the third unit 14 are respectively located at the output end of the harness isolation plate assembly 1 and the second unit 13 and the third unit 14 are connected through the connecting assembly 2. Meanwhile, the fourth unit 15 is located at one end far away from the second unit 13 and the third unit 14. The harness isolation plate assembly 1 further includes a plurality of first units 12, where the plurality of first units 12 are of a same structure and adjacent first units 12 are connected through the connecting assembly 2, the first unit 12 and the second unit 13 are connected through the connecting assembly 2, the first unit 12 and third unit 14 are connected through the connecting assembly 2, and the first unit 12 and the fourth unit 15 are connected through the connecting assembly 2. Moreover, in the harness isolation plate assembly 1, the structure of each connecting assembly 2 may be the same completely or may not be the same completely.

As shown in FIG. 2, in the battery module A, each of the battery cells 4 is in series connection, that is, the positive electrode lead of the battery cell 4 is connected to the negative electrode lead of the adjacent batter cell 4 through the busbars 112. Moreover, along the width direction Y, two rows of battery cells 4 are included. On such a basis, as shown in FIG. 4 and FIG. 13-FIG. 20, the positions for disposing the busbars 112 and its terminal holes 112 of each isolation unit 11 need to implement series connection of each battery cell 4.

It should be noted that embodiments shown in FIG. 13 to FIG. 20 indicate the structure of each isolation unit 11 upon series connection of the battery cell 4. It can be understood that when the battery cells 4 are in parallel connection or hybrid connection (comprising series connection and parallel connection), the structure of each isolation unit 11 differs. In the present application, the specific structure of each isolation unit 11 is not limited.

To sum up, in the present application, the harness isolation plate assembly 1 is formed by splicing the plurality of isolation units 11, and a size of each isolation unit 11 is small, thus improving locating accuracy of each component, assembling accuracy of the harness isolation plate assembly 1 in the battery module A and connecting reliability of the busbars 112 with the electrode lead 41 of the battery cell 4.

The foregoing descriptions are merely optional embodiments of the present application, but are not intended to limit the present application. For a person skilled in the art, the present application may have various modifications and variations. Any modification, equivalent replacement, and improvement made without departing from the spirit and principle of the present application shall fall within the protection scope of the present application.

What is claimed is:

1. A battery module comprising:
   battery cells having electrode leads;
   a harness isolation plate assembly, wherein the harness isolation plate assembly comprises:
   a plurality of isolation units comprising busbars and insulating films;
   a connecting assembly, the adjacent isolation units being connected through the connecting assembly;
   wherein the connecting assembly comprises a first connecting component and a second connecting component;
   one of the first connecting component and the second connecting component is provided with protrusions, the other of the first connecting component and the second connecting component is provided with coordinating holes, and the protrusions are connected to the coordinating holes;
   each isolation unit is provided with connecting holes;
   at least part of the isolation unit is located between the first connecting component and the second connecting component;
   the protrusions are connected to the coordinating holes and the connecting holes;
   wherein the busbars of the harness isolation plate assembly are connected to the electrode leads.

2. The battery module according to claim 1, wherein the first connecting component comprises a first connecting plate, a second connecting plate and a buffer, one end of the buffer is connected to the first connecting plate, and the other end of the buffer is connected to the second connecting plate; the first connecting plate and the second connecting plate are respectively connected to the adjacent isolation units.

3. The battery module according to claim 2, wherein the buffer is a folded structure located between the first connecting plate and the second connecting plate.

4. The battery module according to claim 2, wherein the second connecting component comprises two fitting plates disposed at an interval, the buffer stretches into a gap between the two fitting plates;
   wherein the two fitting plates are respectively arranged along the height direction with the first connecting plate and the second connecting plate, and
   along the height direction, at least part of one of adjacent isolation units is located between the first connecting plate and one of the two fitting plates and at least part of the other of adjacent isolation units is located between the second connecting plate and the other of the two fitting plates.

5. A battery pack comprising a box body and a battery module, wherein the battery module comprises:
   battery cells having electrode leads;
   a harness isolation plate assembly, wherein the harness isolation plate assembly comprises:
   a plurality of isolation units comprising busbars and insulating films;
   a connecting assembly, the adjacent isolation units being connected through the connecting assembly;
   wherein the connecting assembly comprises a first connecting component and a second connecting component;
   one of the first connecting component and the second connecting component is provided with protrusions, the other of the first connecting component and the second connecting component is provided with coordinating holes, and the protrusions are connected to the coordinating holes;
   each isolation unit is provided with connecting holes;
   at least part of the isolation unit is located between the first connecting component and the second connecting component;
   the protrusions are connected to the coordinating holes and the connecting holes;
   wherein the busbars of the harness isolation plate assembly are connected to the electrode leads.

6. The battery pack according to claim 5, wherein the first connecting component comprises a first connecting plate, a second connecting plate and a buffer, one end of the buffer is connected to the first connecting plate, and the other end of the buffer is connected to the second connecting plate;
   the first connecting plate and the second connecting plate are respectively connected to the adjacent isolation units.

7. The battery pack according to claim 6, wherein the buffer is a folded structure located between the first connecting plate and the second connecting plate.

8. The battery pack according to claim 6, wherein the second connecting component comprises two fitting plates disposed at an interval, the buffer stretches into a gap between the two fitting plates;
   wherein the two fitting plates are respectively arranged along the height direction with the first connecting plate and the second connecting plate, and
   along the height direction, at least part of one of adjacent isolation units is located between the first connecting plate and one of the two fitting plates and at least part of the other of adjacent isolation units is located between the second connecting plate and the other of the two fitting plates.

9. A device using a battery cell as a power supply, and wherein the device comprises:
- a power source, the power source is configured to provide a driving force to the device; and
- a battery module for providing electrical energy to the power source, wherein the battery module comprises:
  battery cells having electrode leads;
  a harness isolation plate assembly, wherein the harness isolation plate assembly comprises:
    a plurality of isolation units comprising busbars and insulating films;
    a connecting assembly, the adjacent isolation units being connected through the connecting assembly;
    wherein the connecting assembly comprises a first connecting component and a second connecting component;
    one of the first connecting component and the second connecting component is provided with protrusions, the other of the first connecting component and the second connecting component is provided with coordinating holes, and the protrusions are connected to the coordinating holes;
    each isolation unit is provided with connecting holes;
    at least part of the isolation unit is located between the first connecting component and the second connecting component;
    the protrusions are connected to the coordinating holes and the connecting holes;
  wherein the busbars of the harness isolation plate assembly are connected to the electrode leads.

10. The device according to claim 9, wherein the first connecting component comprises a first connecting plate, a second connecting plate and a buffer, one end of the buffer is connected to the first connecting plate, and the other end of the buffer is connected to the second connecting plate;
the first connecting plate and the second connecting plate are respectively connected to the adjacent isolation units.

11. The device according to claim 10, wherein the buffer is a folded structure located between the first connecting plate and the second connecting plate.

12. The device according to claim 10, wherein the second connecting component comprises two fitting plates disposed at an interval, the buffer stretches into a gap between the two fitting plates;
wherein the two fitting plates are respectively arranged along the height direction with the first connecting plate and the second connecting plate, and
along the height direction, at least part of one of adjacent isolation units is located between the first connecting plate and one of the two fitting plates and at least part of the other of adjacent isolation units is located between the second connecting plate and the other of the two fitting plates.

\* \* \* \* \*